US007727422B2

(12) United States Patent
Horiuchi et al.

(10) Patent No.: US 7,727,422 B2
(45) Date of Patent: Jun. 1, 2010

(54) ELECTRICALLY-CONDUCTIVE RESIN COMPOSITION FOR POROUS FUEL CELL BIPOLAR PLATE AND METHOD FOR THE PRODUCTION THEREOF

(75) Inventors: Ayumi Horiuchi, Okazaki (JP); Takenori Ikeda, Okazaki (JP)

(73) Assignee: Nisshinbo Industries, Inc., Tokyo (JP)

( * ) Notice: Subject to any disclaimer, the term of this patent is extended or adjusted under 35 U.S.C. 154(b) by 248 days.

(21) Appl. No.: 11/595,846

(22) Filed: Nov. 13, 2006

(65) Prior Publication Data

US 2007/0108422 A1 May 17, 2007

(30) Foreign Application Priority Data

Nov. 15, 2005 (JP) ............................ 2005-329583

(51) Int. Cl.
*H01B 1/00* (2006.01)
*H01M 2/00* (2006.01)

(52) U.S. Cl. ........................................ 252/500; 429/34

(58) Field of Classification Search ................ 252/500; 429/34

See application file for complete search history.

(56) References Cited

U.S. PATENT DOCUMENTS

| | | | | |
|---|---|---|---|---|
| 6,187,466 | B1 | 2/2001 | Schroll et al. | |
| 6,746,792 | B2 * | 6/2004 | Hasegawa et al. | 429/34 |
| 6,864,008 | B2 * | 3/2005 | Otawa et al. | 429/34 |
| 2003/0180597 | A1 * | 9/2003 | Sakamoto et al. | 429/34 |
| 2004/0028981 | A1 * | 2/2004 | Horiuchi et al. | 429/34 |
| 2004/0028982 | A1 * | 2/2004 | Horiuchi | 429/34 |

FOREIGN PATENT DOCUMENTS

| | | | |
|---|---|---|---|
| AT | 389020 | B | 10/1989 |
| JP | 11-195422 | A | 7/1999 |
| JP | 2003-297382 | A | 10/2003 |
| JP | 2004-79194 | A | 3/2004 |

* cited by examiner

*Primary Examiner*—Mark Kopec
*Assistant Examiner*—Jaison P Thomas
(74) *Attorney, Agent, or Firm*—Westerman, Hattori, Daniels & Adrian, LLP

(57) ABSTRACT

The present invention provides an electrically-conductive resin composition for a porous fuel cell bipolar plate capable of forming a porous fuel cell bipolar plate having superior absorption of water produced (resulting in the reduction in a gas permeability) as well as limited elution of impurities (a high rate of electricity generating efficiency). An electrically-conductive resin composition for a porous fuel cell bipolar plate comprising an electrically-conductive material and a resin is provided, and the resin is a resin such as, a powdered resol-type phenolic resin having flow properties of from 5 to 100 mm at 125° C.

9 Claims, No Drawings

ELECTRICALLY-CONDUCTIVE RESIN COMPOSITION FOR POROUS FUEL CELL BIPOLAR PLATE AND METHOD FOR THE PRODUCTION THEREOF

CROSS-REFERENCE TO RELATED APPLICATION

This non-provisional application claims priority under 35 U.S.C. §119(a) on Patent Application No. 2005-329583 in Japan on Nov. 15, 2005, the entire contents of which are hereby incorporated by reference.

BACKGROUND OF THE INVENTION

1. Field of the Invention

The present invention relates to an electrically-conductive resin composition for a porous fuel cell bipolar plate and a process for the production thereof.

2. Description of the Related Art

Fuel cells are devices which, when supplied with a fuel such as hydrogen and with atmospheric oxygen, cause the fuel and oxygen to react electrochemically, producing. water and thus directly generating electricity. Because fuel cells are capable of achieving a high fuel-to-energy conversion efficiency and are environmentally adaptable, they are being developed for a variety of applications, including small-scale local power generation, household power generation, simple power supplies for isolated facilities such as campgrounds, mobile power supplies such as for automobiles and small boats, and power supplies for satellites and space development.

Such fuel cells, and particularly solid polymer fuel cells, are built in the form of modules composed of a stack of at least several tens of unit cells. Each unit cell has a pair of plate-like bipolar plates with ribs on either side thereof that define a plurality of channels for the flow of gases such as hydrogen and oxygen. Disposed between the pair of bipolar plates in the unit cell are a solid polymer electrolyte membrane and gas diffusing electrodes made of carbon paper.

This fuel cell bipolar plate is adapted to render the various single cell units electrically conductive, as well as to provide channels for the fuel and air (oxygen) supplied into the single cell units. The fuel cell bipolar plate also acts as a separation wall. To this end, the bipolar plate is required to meet various properties such as a high electrical conductivity, a high level of impermeability of gases, (electrical) chemical stability and hydrophilicity.

The fuel cell bipolar plate has heretofore been produced by a method such as one that has a step of cutting a porous carbonized carbon to form a groove, a method which has steps of subjecting a slurried mixture of graphite powder, binder resin and cellulose fiber to paper making, and then graphitizing the paper (Patent Reference 1: U.S. Pat. No. 6,187,466).

Moreover, such a porous bipolar plate leaves something to be desired in terms of strength. Thus, a bipolar plate has also been used that has an enhanced strength attained by embedding pores so as to form a dense portion. A method of embedding pores is known which has steps of subjecting a bipolar plate obtained by high pressure molding to an amount of a binder that is less than that theoretically required, and impregnating gaps with an impregnant so as to form a dense portion (Patent Reference 2: JP-A-11-195422).

Among methods of reducing the pores in the bipolar plate, a method is known which has a step of providing graphite coated by a resin having a low rate of weight reduction (Patent Reference 3: JP-A-2003-297382).

On the other hand, a bipolar plate is known that is obtained by molding (compression molding) a mixture of graphite and resin. Such a bipolar plate obtained by molding has heretofore been used in a dense form so as to prevent leakages of gas.

However, such a dense bipolar plate is susceptible to flooding in the gas flow channel (blocking of grooves by the water produced). In an attempt to solve the problem, a technique has been developed for rendering the interior of the molded bipolar plate porous (Patent Reference 4: Austrian Patent 389, 020).

The porous bipolar plate absorbs the water produced by means of its porous portion. The water produced acts to cap the porous portion. Therefore, even the porous material can prevent leakages of gases.

However, the porous bipolar plate has deficiencies in terms of strength because of its porosity and has disadvantage that on occasions breakages and cracks have occurred during assembly and stacking operations.

A technique has accordingly been developed for making compact the portion of the fuel cell bipolar plate that is subjected to pressure during assembly and stacking, and at the same time for rendering the gas flow channel porous (Patent Reference 5: JP-A-2004-79194).

One of the most important requirements for a porous bipolar plate is to enhance water absorption. In other words, in order to prevent the kind of flooding mentioned above, it is necessary that water be absorbed in an amount that is more than a predetermined value. To this end, a porous fuel cell bipolar plate having an appropriate proper porosity has been demanded.

SUMMARY OF THE INVENTION

The invention has been worked out under the circumstances already described above. It is therefore an object of the invention to provide an electrically-conductive resin composition capable of forming a porous fuel cell bipolar plate that has a superior absorption of water produced (resulting in a reduction in the level of gas permeability) as well as limited elution of impurities (i.e., a high rate of electricity generating efficiency), and a method for the production thereof.

We have discovered that a plate obtained from an electrically-conductive resin composition including an electrically-conductive material and a resin having specific flow properties exhibits an excellent water absorption, and hence a low level of gas permeability, as well as limited elution of impurities, and that it is thus useful as a plate for a fuel cell bipolar plate. The invention has thus been accomplished.

The invention provides the following aspects:

1. An electrically-conductive resin composition for a porous fuel cell bipolar plate including an electrically-conductive material and a resin having flow properties of from 5 to 100 mm at 125° C.

2. The electrically-conductive resin composition for a porous fuel cell bipolar plate as defined in Clause 1 above, wherein the resin is a powdered resol-type phenolic resin.

3. The electrically-conductive resin composition for a porous fuel cell bipolar plate as defined in Clause 2 above, wherein the resol-type phenolic resin is a solid ammonia resol-type phenolic resin.

4. The electrically-conductive resin composition for a porous fuel cell bipolar plate as defined in Clause 1 above, wherein the aforesaid electrically-conductive material comprises two, or more, graphite-based materials having different, or varying, particle diameters.

5. A method for the production of an electrically-conductive resin composition for a porous fuel cell bipolar plate which comprises mixing an electrically-conductive material with a resin having flow properties of from 5 to 100 mm at 125° C.

The electrically-conductive resin composition for a porous fuel cell bipolar plate of the invention includes an electrically-conductive material and a resin having flow properties falling within a predetermined range. The use of the electrically-conductive resin composition for a porous fuel cell bipolar plate according to the invention makes it possible to obtain a fuel cell bipolar plate with a high absorption of water produced (resulting in a reduction in the level of gas permeability), as well as limited elution of impurities, to prevent flooding and to enhance the rate of electricity-generating efficiency of the fuel cell.

DESCRIPTION OF THE PREFERRED EMBODIMENTS

The invention will now be described in further detail.

The electrically-conductive resin composition for a porous fuel cell bipolar plate according to the invention includes an electrically-conductive material and a resin having flow properties of from 5 to 100 mm at 125° C.

The resin of the invention exhibits flow properties of from 5 to 100 mm at 125° C. The term "flow properties", as used herein, is meant to indicate a value indicating a curing rate of resin and measured at 125° C. according to JIS K6910.

In the invention, when the flow properties of the resin fall within a range of from 5 to 100 mm, preferably from 10 to 90 mm, more preferably from 20 to 80 mm, and even more preferably from 25 to 60 mm, a bipolar plate having a high moldability, as well as a high water absorption, can be obtained, and making it possible to prevent effectively impurities from eluting from the bipolar plate. The reasons for this phenomenon are unknown but are presumably because the use of a resin having proper flow properties causes the electrically-conductive material particles to be bonded to one another at points, rather than surfaces, resulting in the formation of an appropriate porosity in a plate thus obtained.

On the contrary, when the flow properties of the resin exceeds 100 mm, it becomes difficult to obtain a plate having an appropriate porosity, and making it impossible to obtain a bipolar plate having the above-mentioned properties, probably because the electrically-conductive material particles are bonded to each other on surfaces rather than at points. When the flow properties of the resin fall below 5 mm, it is more likely that a resultant composition will reveal a deterioration in a moldability.

Further, the gel time of a resin measured according to JIS K6910 is preferably from 50 to 400 seconds, more preferably from 60 to 350 seconds, and even more preferably from 75 to 300 seconds. When the gel time of the resin falls within the range defined above, the resin exhibits satisfactory melt properties under pressure, making it easy to form a desired porous structure. On the contrary, when the gel time of the resin falls below 50 seconds, the resin cannot be melted even under pressure, entailing a risk of difficulties to mold a body. When the gel time of the resin exceeds 400 seconds, the resin covers the electrically-conductive particles under pressure, entailing a risk of difficulties to form a porous structure.

The resin employable herein is not subject to any particular limitation as long as it has flow properties that fall within the range defined above. Examples of resins employable herein include phenolic resins, epoxy resins, benzoxazine resins, carbodiimide resins, unsaturated polyester resins, chlorinated polyethylene resins, and diallyl phthalate resins. From the standpoint of enhancement of hydrophilicity, which is one of the requirements for porous bipolar plates, preferred among these resins are phenolic resins, which themselves have a good hydrophilicity. Resol-type phenolic resins are particularly preferred. When such a resol-type phenolic resin is used, the use of organic materials (hexamethylene tetramine, etc.) required to cure the resin can be minimized, making it possible to reduce further an elution of organic materials from the surface layer of the bipolar plate thus obtained, and hence to reduce the loss of electricity-generating capacity of the fuel cell.

The resin of the invention is preferably in the form of powder. When an arrangement of this kind is adopted, the phenomenon of the electrically-conductive particles being covered with the resin during mixing (compounding) of the electrically-conductive powder with the resin can be avoided.

Preferred examples of resol-type phenolic resins employable herein include a solid ammonia resol-type phenolic resin obtained as a curing catalyst in the presence of an amine compound such as ammonia, a primary amine or a secondary amine. Since the curing catalyst used in the production of the resin is free of metallic components, this resin has no metallic components left therein, making it possible to reduce further an elution of metallic components from the surface layer of the bipolar plate thus obtained.

The aforementioned resins may be used in an admixture of two or more thereof. In such cases, it is essential that the flow properties of the resin mixture at 125° C. fall within the range defined above.

The aforementioned electrically-conductive material is not subject to any particular limitation but may be appropriately selected from known related art electrically-conductive materials such as natural graphite, artificial graphite and exfoliated graphite. Two or more such electrically-conductive materials may be used in an admixture. The average particle diameter of the electrically-conductive material is not subject to any particular limitation but is normally from 10 to 100 μm, and preferably from 25 to 60 μm.

Preferred among such electrically-conductive materials are artificial graphite and spherical natural graphite. These graphite materials have a form relatively close to a sphere and thus suitable pores can be easily formed in the bipolar plate thus obtained.

In the invention, artificial graphite is particularly ideal. Artificial graphite has a high purity (low impurity content) and is thus ideal for porous bipolar plates, which are subjected to exposure by carbon content on their surfaces, and from which impurities can thus easily be eluted.

Two, or more, electrically-conductive materials having different, or varying particle diameters may be used. The combined use of electrically-conductive materials having varying particle diameters makes it possible to provide the bipolar plate thus obtained with an enhanced level of permeability to water produced and an enhanced rate of absorption of water produced. In particular, taking into account the enhancement of water absorption, graphite having an average particle diameter of from 30 to 100 μm, and graphite having an average particle diameter of from 5 to 30 μm, are preferably used in combination. For the same reasons as already described above, artificial graphite is preferably also used in this case.

The mixing proportions of the electrically-conductive powder and the resin in the electrically-conductive resin composition of the invention are not subject to any particular limitation but on the basis of 100 parts by weight of resin composition may respectively be from 50 to 95 parts of electrically-conductive materials by weight and from 10 to 30 parts of resin by weight, and it is particularly preferable that the mixing proportion is from 70 to 95 parts of electrically-conductive materials by weight and from 10 to 20 parts of resin by weight. In cases where two different electrically-conductive powders are used, their mixing proportions are arbitrary, but it is preferable that, again on the basis of 100 parts by weight of composition, the mixing proportion of the electrically-conductive powder having a great average particle diameter and the electrically-conductive powder having a smaller average particle diameter respectively be from 40 to 80 parts by weight and from 5 to 25 parts by weight, and it is particularly preferable that the mixing proportion is from 50 to 75 parts by weight and from 10 to 20 parts by weight.

In addition to the various essential components mentioned above the electrically-conductive resin composition of the invention may also as, when necessary, contain carbon-based materials such as organic fibers, inner release agents, carbon fibers, carbon black, carbon nanotube and fullerene, incorporated therein, on the basis of the total weight of the composition, in amounts of from 0.1 to 20 parts by weight, and preferably from 1 to 10 parts by weight.

In order to form the electrically-conductive resin composition of the invention, a raw material obtained by compounding a mixture of the aforementioned various components is preferably used. In this case, a compounding method is not subject to any particular limitation. The mixture of the various components may be stirred, granulated and dried by any known methods.

The mixture thus compounded is preferably sieved to obtain uniformity in grain size so that no secondary agglomeration occurs. In this case, although the grain size does depend on the particle diameter of the electrically-conductive powder, the grain size of the composition thus sieved should be such that the average particle diameter is preferably 60 μm or more and the grain size distribution is from 10 μm to 2.0 mm, preferably from 30 μm to 1.5 mm, and particularly preferably from 50 μm to 1.0 mm.

The method of forming the electrically-conductive resin composition of the invention (and compounded raw material) is not subject to any particular limitation as long as a porous bipolar plate can be produced. Methods such as compression molding, injection molding, extrusion and sheet forming, may be employed, but compression molding is preferably used because when this method is utilized, the formation of a uniform porous structure becomes possible.

The pressure under which compression molding is conducted is not subject to any particular limitation and may be appropriately determined in advance depending on the desired porous bipolar plate. However, the compression molding pressure, (hereinafter referred to as "contact pressure"), is normally from 0.1 to 20 MPa, preferably from 1.0 to 15 MPa, and more preferably from 2.0 to 10 MPa.

When the contact pressure falls below 0.1 MPa, there is a likelihood that a strength high enough to maintain the desired shape of the porous molded body cannot be obtained. In contrast, when the contract pressure exceeds 20 MPa, the molding machine and the mold are subjected to strain, thus increasing the likelihood that the fuel cell bipolar plate thus obtained will be subjected to a deterioration in precision of both surface and dimensions. Further, there is a likelihood that the pores may be collapsed, making it difficult to control the pores in the porous bipolar plate.

The porosity of the aforementioned porous bipolar plate is preferably from 1 to 50%, and more preferably from 10 to 30%. When the porosity of the porous bipolar plate falls below 1%, the resultant bipolar plate manifests a deterioration in an absorption of water produced during electricity generation, thus increasing the likelihood that water will block groove portions which form gas flow channels. In contrast, when the porosity of the porous bipolar plate exceeds 50%, the bipolar plate cannot be shaped to a high precision. Further, there is a likelihood that the strength of the resultant bipolar plate will deteriorate.

Since, as mentioned above, the electrically-conductive resin composition of the invention includes an electrically-conductive material and a resin having flow properties falling within a predetermined range the porosity of a plate obtained therefrom can be appropriately adjusted. The use of the porous plate makes it possible to obtain a porous fuel cell bipolar plate that is superior in terms of its capacity to prevent flooding.

EXAMPLES

The following Examples and Comparative Examples are provided by way of illustration and not by way of limitation. In the following description, an average particle diameter, flow properties and the length of gel time were measured by the following methods.

[1] Average Particle Diameter

Measured using a Microtrak particle diameter analyzer.

[2] Flow Properties

One point zero grams of a sample resin was compressed so as to obtain a tablet. The tablet was then put in a predetermined position on a glass plate disposed in a constant temperature bath, the temperature of which had been set to 125° C. After one minute, the glass plate was tilted at an angle of 30°, and then allowed to stand as it was. After 20 minutes, the glass plate was withdrawn. The distance over which the resin had flown was then measured (according to JIS K6910).

[3] Gel Time

Zero point five gram of a sample resin was put in a predetermined position on a hot plate, the temperature of which had been set to 150° C. The sample was then lightly pressed toward the hot plate by means of a spatula which had been previously heated. The time at which the sample was entirely melted was deemed to be 0 seconds. The sample was then kneaded by moving the spatula, once every second, in a direction of a circle having a diameter of about 30 mm. The period of time required before the sample no longer threaded between the hot plate and the spatula was defined to be the gel time (according to JIS K6910).

Example 1

Seventy-five parts by weight of an artificial graphite powder having an average particle diameter of 35 μm, 15 parts by weight of an artificial graphite powder having an average particle diameter of 20 μm and 10 parts by weight of a resol-type phenolic resin (a bisphenol A type resin in the form of powder having flow properties of 29 mm and a gel time of 268 seconds) were mixed and stirred so as to obtain an electrically-conductive resin composition which was then granulated, dried and sieved to obtain a raw material having a grain size distribution of from 0.1 mm to 1.0 mm. The raw material thus obtained was set into a mold that has groove portions formed therein and in the mold the raw material was then subjected to compression molding at a contact pressure of 10 MPa and a temperature of 180° C. for a period of 5 minutes so as to form a porous fuel cell bipolar plate having rib-shaped groove portions.

Example 2

Seventy-five parts by weight of an artificial graphite powder having an average particle diameter of 35 μm, 15 parts by weight of an artificial graphite powder having an average particle diameter of 20 μm and 10 parts by weight of a solid ammonia resol-type phenolic resin (an amine-based catalyst, in the form of powder having flow properties of 55 mm and a gel time of 84 seconds) were mixed and stirred so as to obtain an electrically-conductive resin composition which was then granulated, dried and sieved so as to obtain a raw material having a grain size distribution of from 0.1 mm to 1.0 mm. The raw material thus obtained was set into a mold that has groove portions formed therein and in the mold the raw material was then subjected to compression molding at a contact pressure of 10 MPa and a temperature of 180° C. for a period of 5 minutes so as to form a porous fuel cell bipolar plate having rib-shaped groove portions.

Example 3

Seventy-five parts by weight of an artificial graphite powder having an average particle diameter of 50 μm, 15 parts by weight of an artificial graphite powder having an average particle diameter of 20 μm and 10 parts by weight of a solid ammonia resol-type phenolic resin (an amine-based catalyst, in the form of powder having flow properties of 46 mm and a gel time of 102 seconds) were mixed and stirred so as to obtain an electrically-conductive resin composition which was then granulated, dried and sieved so as to obtain a raw material having a grain size distribution of from 0.1 mm to 1.0 mm. The raw material thus obtained was set into a mold that has groove portions formed therein and in the mold the raw material was then subjected to compression molding at a contact pressure of 10 MPa and a temperature of 180° C. for a period of 5 minutes so as to form a porous fuel cell bipolar plate having rib-shaped groove portions.

Example 4

Ninety parts by weight of an artificial graphite powder having an average particle diameter of 35 μm and 10 parts by weight of a solid ammonia resol-type phenolic resin (an amine-based catalyst, in the form of powder having flow properties of 55 mm and a gel time of 84 seconds) were mixed and stirred so as to obtain an electrically-conductive resin composition which was then granulated, dried and sieved so as to obtain a raw material having a grain size distribution of from 0.1 mm to 1.0 mm. The raw material thus obtained was set into a mold that has groove portions formed therein and in the mold the raw material was then subjected to compression molding at a contact pressure of 10 MPa and a temperature of 180° C. for a period of 5 minutes so as to form a porous fuel cell bipolar plate having rib-shaped groove portions.

Example 5

Forty-five parts by weight of an artificial graphite powder having an average particle diameter of 60 μm, 45 parts by weight of an artificial graphite powder having an average particle diameter of 50 μm and 10 parts by weight of a solid ammonia resol-type phenolic resin (an amine-based catalyst, in the form of powder having flow properties of 55 mm and a gel time of 84 seconds) were mixed and stirred so as to obtain an electrically-conductive resin composition which was then granulated, dried and sieved so as to obtain a raw material having a grain size distribution of from 0.1 mm to 1.0 mm. The raw material thus obtained was set into a mold that has groove portions formed therein and in the mold the raw material was then subjected to compression molding at a contact pressure of 10 MPa and a temperature of 180° C. for a period of 5 minutes so as to form a porous fuel cell bipolar plate having rib-shaped groove portions.

Example 6

Ninety parts by weight of a natural graphite powder having an average particle diameter of 30 μm and 10 parts by weight of a resol-type phenolic resin (an amine-based catalyst, in the form of powder having flow properties of 55 mm and a gel time of 84 seconds) were mixed and stirred so as to obtain an electrically-conductive resin composition which was then granulated, dried and sieved so as to obtain a raw material having a grain size distribution of from 0.1 mm to 1.0 mm. The raw material thus obtained was set into a mold that has groove portions formed therein and in the mold the raw material was then subjected to compression molding at a contact pressure of 10 MPa and a temperature of 180° C. for a period of 5 minutes so as to form a porous fuel cell bipolar plate having rib-shaped groove portions.

Comparative Example 1

Forty-five parts by weight of an artificial graphite powder having an average particle diameter of 60 μm, 45 parts by weight of an artificial graphite powder having an average particle diameter of 50 μm and 10 parts by weight of a resol-type phenolic resin (an amine-based catalyst, in the form of liquid having flow properties that were not able to be measured and a gel time of 450 seconds) were mixed and stirred so as to obtain an electrically-conductive resin composition which was then granulated, dried and sieved so as to obtain a raw material having a grain size distribution of from 0.1 mm to 1.0 mm. The raw material thus obtained was set into a mold that has groove portions formed therein and in the mold the raw material was then subjected to compression molding at a contact pressure of 10 MPa and a temperature of 170° C. for a period of 5 minutes so as to form a porous fuel cell bipolar plate having rib-shaped groove portions.

Comparative Example 2

Eighty parts by weight of an artificial graphite powder having an average particle diameter of 60 μm and 15 parts by weight of a resol-type phenolic resin (an amine-based catalyst, in the form of liquid having flow properties that were not able to be measured and a gel time of 450 seconds) were mixed and stirred so as to obtain an electrically-conductive resin composition which was then granulated, dried and sieved so as to obtain a raw material having a grain size distribution of from 0.1 mm to 1.0 mm. The raw material thus obtained was set into a mold that has groove portions formed therein and in the mold the raw material was then subjected to compression molding at a contact pressure of 10 MPa and a temperature of 170° C. for a period of 5 minutes to form a porous fuel cell bipolar plate having rib-shaped groove portions.

Comparative Example 3

Ninety parts by weight of an artificial graphite powder having an average particle diameter of 35 μm and 10 parts by weight of a resol-type phenolic resin (an amine-based catalyst, in the form of powder having flow properties of 3 mm and a gel time of 75 seconds) were mixed and stirred so as to obtain an electrically-conductive resin composition which was then granulated, dried and sieved so as to obtain a raw material having a grain size distribution of from 0.1 mm to 1.0 mm. The raw material thus obtained was set into a mold that has groove portions formed therein and in the mold the raw material was then subjected to compression molding at a contact pressure of 10 MPa and a temperature of 180° C. for a period of 5 minutes so as to form a porous fuel cell bipolar plate having rib-shaped groove portions.

Comparative Example 4

Ninety parts by weight of an artificial graphite powder having an average particle diameter of 35 μm and 10 parts by weight of a resol-type phenolic resin (an amine-based catalyst, in the form of powder having flow properties of 130 mm and a gel time of 250 seconds) were mixed and stirred so as to obtain an electrically-conductive resin composition which was then granulated, dried and sieved so as to obtain a raw material having a grain size distribution of from 0.1 mm to 1.0 mm. The raw material thus obtained was set into a mold that has groove portions formed therein, and in the mold the raw material was then subjected to compression molding at a contact pressure of 10 MPa and a temperature of 180° C. for a period of 5 minutes so as to form a porous fuel cell bipolar plate having rib-shaped groove portions.

The fuel cell bipolar plates thus obtained in the aforementioned various examples and comparative examples were each then measured and evaluated for flexural strength, resistivity, water absorption time, electrical conductivity of leachate water and moldability. The results are presented in Table 1 below.

[4] Electrical Conductivity of Leachate Water

A hot water dipping test was conducted. In more concrete terms, 15 g of the bipolar plate obtained was dipped in 400 g of 90° C. water for a period of 100 hours. The electrical conductivity of the leachate water was then measured.

For the measurement of electrical conductivity, a Type CM-21P portable electrical conductivity meter (produced by DKK-TOA CORPORATION) was used. The measurements were then converted to a 25° C. basis.

[5] Moldability

The bipolar plate was visually observed so as to confirm the state of the molding. Examples where an accurate reproduction of the mold was obtained have been evaluated "good" and those demonstrating an inaccurate reproduction of the mold have been evaluated "unsatisfactory".

[6] Porosity

For the measurement of porosity, mercury porosimetry was employed.

As can be seen in Table 1, the fuel cell bipolar plates of the various examples obtained from the electrically-conductive resin composition of the invention using resins having specific flow properties are superior to the comparative bipolar plates in terms of water absorption, which is one of main properties required for a porous bipolar plate. Further, an elution of impurities from the bipolar plate of the invention is low, so that the electrical conductivity of dipping hot water solution shows very low degree. It is also apparent that the fuel cell bipolar plates of the invention are superior to those of the comparative bipolar plates in respect of properties such as strength and resistivity, and that from a practical point of view they are all of values that present no problems.

TABLE 1

| | Resin | | Bipolar plate | | | | | |
|---|---|---|---|---|---|---|---|---|
| | Flow properties (mm) | Gel time (seconds) | Flexural strength (MPa) | Resistivity (mΩ · cm) | Water absorption time (seconds) | Electrical conductivity (μS/cm) | Moldability | Porosity (%) |
| Example 1 | 29 | 268 | 18 | 13 | 10 | 10 | Good | 25 |
| Example 2 | 55 | 84 | 18 | 13 | 15 | 40 | Good | 22 |
| Example 3 | 46 | 102 | 22 | 12 | 20 | 20 | Good | 20 |
| Example 4 | 55 | 84 | 20 | 12 | 30 | 40 | Good | 22 |
| Example 5 | 55 | 84 | 20 | 12 | 80 | 40 | Good | 25 |
| Example 6 | 55 | 84 | 15 | 10 | 120 | 50 | Good | 15 |
| Comparative Example 1 | — | 450 | 6 | 120 | Not less than 600 | 5000 | Unsatisfactory | 18 |
| Comparative Example 2 | — | 450 | 8 | 240 | Not less than 600 | 5000 | Unsatisfactory | 30 |
| Comparative Example 3 | 3 | 75 | 0.1 | 100 | 1 | 4000 | Unsatisfactory | 50 |
| Comparative Example 4 | 130 | 250 | 7 | 200 | Not less than 600 | 4000 | Unsatisfactory | 8 |

The properties in Table 1 were measured using the following methods.

[1] Flexural Strength

Measured based on ASTM D7980.

[2] Electrical Resistivity

Measured based on JIS C2525.

[3] Water Absorption Time

The period of the time was measured until 0.0025 g of ion-exchanged water which had been dropped onto the surface of the bipolar plate was absorbed onto the surface of the bipolar plate in a constant temperature bath, the relative humidity of which had been set to 80%.

Japanese Patent Application No. 2005-329583 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A porous fuel cell bipolar plate being obtained from an electrically-conductive resin composition comprising an electrically-conductive material and a resin comprising a solid ammonia resol-type phenolic resin having flow properties of from 5 to 100 mm at 125° C., and having a porosity of 10 to 30%.

2. The porous fuel cell bipolar plate according to claim 1, wherein the resol-type phenolic resin is a powdered resol-type phenolic resin.

3. The porous fuel cell bipolar plate according to claim 1, wherein the electrically-conductive material comprises two or more graphite-based materials having different, or varying average particle diameters.

4. The porous fuel cell bipolar plate according to claim 1, wherein the resin consists of said resol-type phenolic resin.

5. The porous fuel cell bipolar plate according to claim 1, wherein the flow properties are within a range of from 25 to 60 mm at 125° C.

6. A method for the production of a porous fuel cell bipolar plate having a porosity of 10 to 30% which comprises mixing an electrically-conductive material with a resin comprising a solid ammonia/resol-type phenolic resin having flow properties of from 5 to 100 mm at 125° C.

7. The method according to claim 6, wherein both the electrically-conductive material and the phenolic resin are in the form of powder.

8. The method according to claim 6, wherein the resin consists of said resol-type phenolic resin.

9. The method according to claim 6, which comprises mixing the electrically-conductive material with the resin to obtain a mixture, then compounding the mixture to obtain a raw material having a grain size distribution of from 10 μm to 2.0 mm.

* * * * *